(12) United States Patent
Wolfe

(10) Patent No.: US 7,089,879 B2
(45) Date of Patent: Aug. 15, 2006

(54) METHODS FOR MANIPULATING AIR CELLS WITHIN AVIAN EGGS

(75) Inventor: Stephen P. Wolfe, Chapel Hill, NC (US)

(73) Assignee: Embrex, Inc., Durham, NC (US)

( * ) Notice: Subject to any disclaimer, the term of this patent is extended or adjusted under 35 U.S.C. 154(b) by 211 days.

(21) Appl. No.: 10/934,201

(22) Filed: Sep. 3, 2004

(65) Prior Publication Data

US 2005/0051104 A1    Mar. 10, 2005

Related U.S. Application Data

(60) Provisional application No. 60/501,644, filed on Sep. 9, 2003.

(51) Int. Cl.
*A01K 45/00* (2006.01)
*A01K 29/00* (2006.01)

(52) U.S. Cl. ......................... 119/6.8; 119/174
(58) Field of Classification Search ................ 119/6.8, 119/174, 311, 417, 418
See application file for complete search history.

(56) References Cited

U.S. PATENT DOCUMENTS

| | | | | | |
|---|---|---|---|---|---|
| 4,973,595 | A | * | 11/1990 | Robel | 514/345 |
| 5,206,015 | A | * | 4/1993 | Cox et al. | 424/93.3 |
| 5,598,807 | A | * | 2/1997 | Cox et al. | 119/6.8 |
| 5,699,751 | A | * | 12/1997 | Phelps et al. | 119/6.8 |
| 5,967,080 | A | * | 10/1999 | Cox et al. | 119/6.8 |
| 6,240,877 | B1 | * | 6/2001 | Bounds | 119/6.8 |
| 6,286,455 | B1 | * | 9/2001 | Williams | 119/6.8 |
| 6,527,498 | B1 | * | 3/2003 | Chalker et al. | 414/754 |
| 6,601,533 | B1 | * | 8/2003 | Bounds, Jr. | 119/6.8 |

* cited by examiner

*Primary Examiner*—Yvonne R. Abbott
(74) *Attorney, Agent, or Firm*—Myers Bigel Sibley & Sajovec

(57) ABSTRACT

An egg is accelerated such that the inner and outer shell membranes separate and allow the air cell to move within the egg when the egg is repositioned. By separating the outer and inner shell membranes of an egg, the air cell will reposition itself at the upper portion of the egg shell. An egg may be accelerated in various ways according to embodiments of the present invention including, but not limited to, agitation, "flicking" by hand, spinning, rotating, centrifuging, etc.

44 Claims, 4 Drawing Sheets

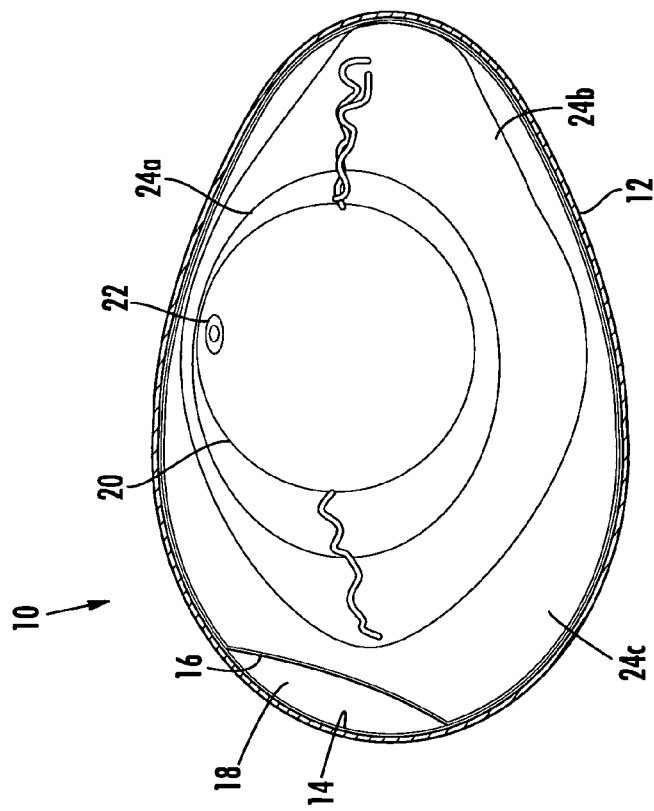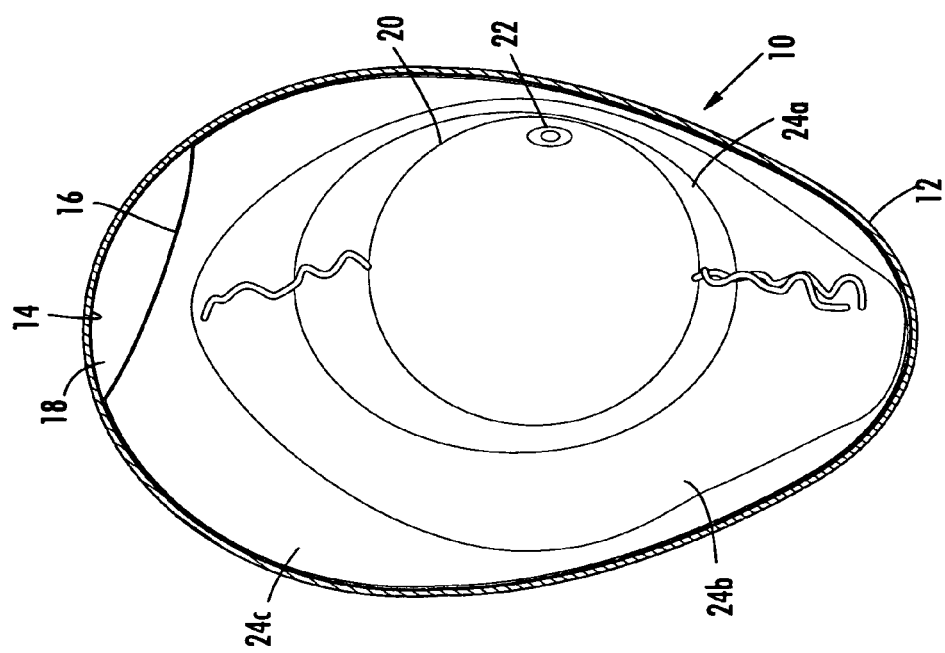
FIG. 2B
FIG. 2A

METHODS FOR MANIPULATING AIR CELLS WITHIN AVIAN EGGS

RELATED APPLICATION

This application claims the benefit of U.S. Provisional Application No. 60/501,644 filed Sep. 9, 2003, the disclosure of which is incorporated herein by reference in its entirety as if set forth fully herein.

FIELD OF THE INVENTION

The present invention relates generally to eggs and, more particularly, to methods of processing eggs.

BACKGROUND OF THE INVENTION

In poultry hatcheries and other egg processing facilities, eggs are handled and processed in large numbers. The term "processing" includes treating live eggs with medications, nutrients, hormones and/or other beneficial substances while the embryos are still in the egg (i.e., in ovo). In ovo injections of various substances into avian eggs have been employed to decrease post-hatch morbidity and mortality rates, increase the potential growth rates or eventual size of the resulting bird, and even to influence the gender determination of the embryo. Injection of vaccines into live eggs have been effectively employed to immunize birds in ovo.

There are a number of applications for which it is desirable to inject eggs containing early avian embryos. For example, it may be desirable to deliver a substance to an early embryo, such as a blastoderm. To illustrate, it may be desirable in the poultry industry to manipulate an early embryo in ovo to introduce a foreign nucleic acid molecule (i.e., to create a transgenic bird) or to introduce a foreign cell(s) (i.e., to create a chimeric bird) into the developing embryo. Unfortunately, blastoderm visibility is very poor in the presence of the inner shell membrane of an avian egg. Moreover, blastoderm position may not be in the most favorable location for receiving a substance.

In addition, there a number of applications for which it is desirable to remove samples from eggs, including from early avian embryos. Further, there are a number of applications for which it is desirable to insert a sensing device inside an egg containing an embryo to collect information therefrom.

Current methods of inserting devices into avian eggs containing early embryos may be undesirable because they may result in unacceptably low hatch rates, and may cause other problems, such as the introduction of air bubbles into an egg, damage to extra-embryonic membranes or to the embryo itself, or a combination of these factors. Accordingly, there is a need in the art for improved methods of inserting devices into avian eggs.

SUMMARY OF THE INVENTION

In view of the above discussion, methods of manipulating the air cell within avian eggs are provided. Applicants have unexpectedly discovered that the air cell within avian eggs can be moved. Conventionally, it was believed that the inner and outer-shell membranes of an avian egg were fused together, except at the air cell, and that they could not be separated. Applicants have unexpectedly discovered that, while the inner and outer shell membranes may have linkages and connections, they can be separated to allow the air cell to move. Applicants have also discovered that avian eggs that have had the air cell therein moved, according to embodiments of the present invention, and then subsequently incubated as per commercial incubation practices, do not exhibit reduced hatch rates.

According to embodiments of the present invention, an egg is accelerated such that the inner and outer shell membranes within an egg separate and allow the air cell to move within the egg when the egg is repositioned. By separating the outer and inner shell membranes of an egg, the air cell will reposition itself at the upper portion of the egg shell when the egg is positioned on its side. An egg may be accelerated in various ways according to embodiments of the present invention including, but not limited to, agitation, "flicking" by hand, spinning, rotating, centrifuging, etc.

Movement of an air cell, according to embodiments of the present invention, can be desirable because it facilitates access through the inner shell membrane through the side of the egg. The side of an egg is where the blastoderm can be positioned more predictably and, since there is less albumen between the inner shell membrane and the yolk in the side of the egg (as opposed to the blunt end), visibility of the blastoderm through the membrane is much improved.

According to embodiments of the present invention, a method of injecting material into an avian egg containing a blastoderm and an air cell includes accelerating the egg such that the inner and outer shell membranes of the egg separate so as to allow movement of the air cell within the egg when the egg is repositioned. The egg is then oriented in a predetermined (e.g., generally horizontal or sideways) position, which causes the air cell to move to a location beneath an upward-facing portion of the shell of the egg. The egg is stored in the generally sideways position for a predetermined period of time to allow the blastoderm to position itself on the side, under or near the air cell. A small opening is introduced into the upward-facing portion of the egg shell via one of any number of ways known to those skilled in the art. For example, an opening in the shell may be made by drilling the shell, removing the shell and then removing a portion of the outer shell membrane. Alternatively, an opening in the shell may be made by drilling or punching the shell and membrane such that both a shell portion and outer shell membrane portion are removed at the same time.

A device is then extended through the small opening in the egg shell and into the egg. The device extends through the air cell and pierces the inner shell membrane. One or more substances are released through the delivery device and deposited into the blastoderm or in close proximity thereto. One or more substances may also be deposited in other locations within the egg. Injection through the air cell, which is preferred, is thereby facilitated regardless of the position of the egg.

According to embodiments of the present invention, it may be desirable to compromise the cells in a recipient embryo prior to the injection of material (e.g., donor cells) into the egg. Cell compromise can be achieved in a variety of ways including, but not limited to, heating, cooling, coring, exposing to radiation (e.g., x-rays, ultraviolet, infrared, gamma ray, radio frequency), exposure to ammonia and/or other solvents, etc.

According to embodiments of the present invention, material may be sampled from one or more locations within the egg. For example, one or more samples (e.g., blastodermal cells) may be removed from the blastoderm or from close proximity thereto. One or more samples may be taken from the extra-embryonic portions of the egg (e.g., the yolk or the albumen). For example, a sample may be taken from the albumen to determine the presence or absence of microbial contamination (e.g., *Salmonella*) therein. A sample may be removed from the egg to obtain information therefrom. The sample may be removed, for example, in connection with methods of sexing or determining the viability of an embryo. The sample may be removed, for example, to perform genetic testing for traits, pathogens, etc.

According to embodiments of the present invention, a detector maybe inserted into the egg to obtain various types of information from the interior of the egg. A detector may be inserted into an extra-embryonic location of the egg (e.g., the yolk or the air cell). Alternatively, a detector may be placed in close proximity to the embryo. A detector device may be used to collect information including, but not limited to, the size of the embryo, the location of the embryo, the developmental stage of the embryo and/or any characteristic feature of the embryo, the sex of the embryo, and/or the viability of the embryo. The detector device may obtain information regarding the location of the embryo and the subgerminal cavity. Various types of detectors may be utilized including, but not limited to, electrical sensors, optical sensors, chemical sensors, temperature sensors, acoustic sensors, pressure sensors, or any other device for detecting a physical or chemical parameter.

According to embodiments of the present invention, after injecting a substance and/or removing a sample and/or detecting information from an egg, the device is retracted from the egg. The small opening in the egg shell may be sealed with a sealant and the egg may be incubated until hatch or subjected to other processing.

According to other embodiments of the present invention, the inner and outer shell membranes of an avian egg can be physically separated without accelerating the egg. For example, a hole can be formed within the egg shell and a blunt probe or other object can be inserted therein and used to separate the inner and outer shell membranes at the edge of the egg shell.

BRIEF DESCRIPTION OF THE DRAWINGS

FIGS. 2A–2B illustrate non-movement of the air cell within a conventional egg even when the egg is repositioned.

DETAILED DESCRIPTION OF THE INVENTION

Figure 1:
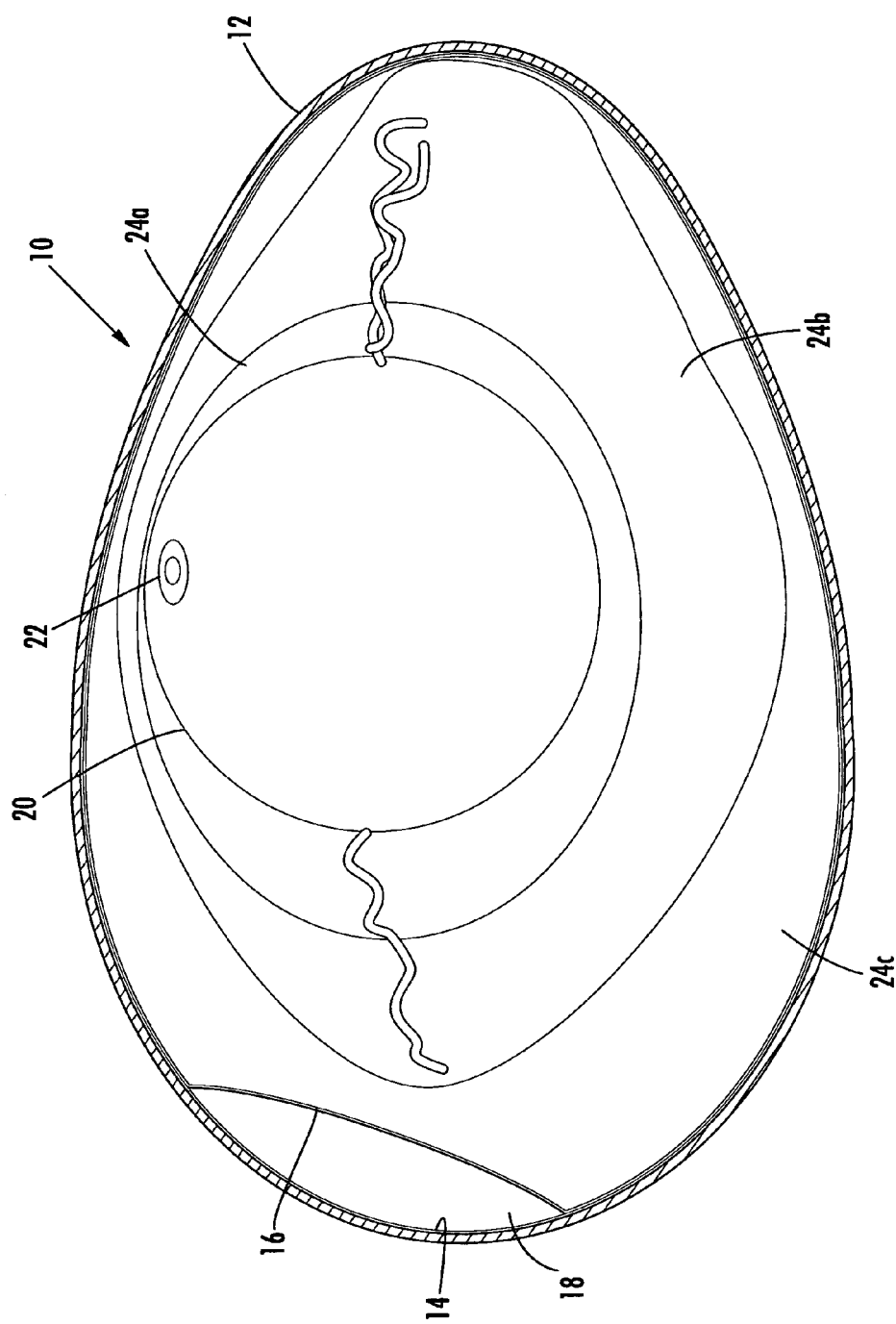
FIG. 1 is a side section view of a conventional avian egg.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, and elements may be exaggerated for clarity. It will be understood that when an element is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upwardly", "downwardly", "vertical", "horizontal" and the like are used herein for the purpose of explanation only.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. All publications, patent applications, patents, and other references mentioned herein are incorporated herein by reference in their entirety.

As used herein, the term "and/or" includes any and all combinations of one or more of the associated listed items.

The terms "avian" and "avian subjects," as used herein, are intended to include males and females of any avian species, but are primarily intended to encompass poultry which are commercially raised for eggs, meat or as pets. Accordingly, the terms "avian" and "avian subject" are particularly intended to encompass various birds including, but not limited to, chickens, turkeys, ducks, geese, quail, pheasant, parakeets, parrots, cockatoo, cockatiel, ostrich, emu, etc.

As used herein, the term "early embryo" refers to an avian embryo from the time of lay (blastodermal stage) through about the developmental stage where primordial germ cells (PGCs) are migrating. With particular respect to chicken embryos, an "early embryo" is generally about an embryonic stage 20 (H&H) embryo or earlier. The developmental stages of the chicken embryo are well-understood in the art, see e.g., The Atlas of Chick Development, R. Bellairs & M. Osmond, eds., Academic Press, 1998.

As used herein, the term "blastoderm" has its understood meaning in the art. Generally, a blastoderm includes an embryo from the time of lay through the end of gastrulation. The blastoderm is sometimes referred to by the alternative designations "germinal disc" or "embryonic disc" in the art. A blastoderm may be described as a flattened disc of cells that forms during cleavage in the early embryo and persists until the end of gastrulation. By the time of laying, two major regions of the blastoderm are visible, the centrally-situated area pellucida and the peripherally-located area opaca (The Atlas of Chick Development, R. Bellairs & M. Osmond, eds., Academic Press, 1998). With particular respect to chicken embryos, the blastoderm is typically characterized as an embryo from the time of lay (i.e., Stage IX or Stage X EG&K) through about stage XIII (EG&K) or higher.

As used herein, the terms "injection" and "injecting" encompass methods of inserting a device into an egg or embryo, including methods of delivering or discharging a substance into an egg or embryo, methods of removing a substance (i.e., a sample) from an egg or embryo, and/or methods of inserting a detector device into an egg or embryo.

The terms "chimeric bird" or "chimeric embryo" refer to a recipient bird or embryo, respectively, that contains cells from another bird or embryo, referred to as a "donor." The terms "transgenic bird" and "transgenic embryo" are used herein in accordance with their generally understood meanings in the art. A transgenic bird or transgenic embryo contains a foreign nucleic acid sequence in one or more cells.

As used herein, the term "membrane" refers to any layer of tissue within an egg. Exemplary membranes within an egg include, but are not limited to, the outer shell membrane, inner shell membrane, chorio-allantoic membrane, VM membrane, and amniotic membrane (amnion).

Referring now to FIG. 1, an avian egg 10 is illustrated. The illustrated egg 10 includes a shell 12, an outer shell membrane 14, an inner shell membrane 16, and an air cell 18 at the blunt end of the egg 10 between the inner and outer shell membranes 14, 16. The illustrated egg 10 also includes a yolk 20 and blastoderm 22 surrounded by inner thin albumen 24a, outer thick albumen 24b, and outer thin albumen 24c. As illustrated in FIGS. 2A–2B, the air cell 18 remains substantially stationary at the blunt end of the egg 10, regardless of the position of the egg 10. This is because the outer and inner shell membranes 14, 16 surround the air cell 18 and maintain the air cell 18 in this stationary position.

Figure 3:
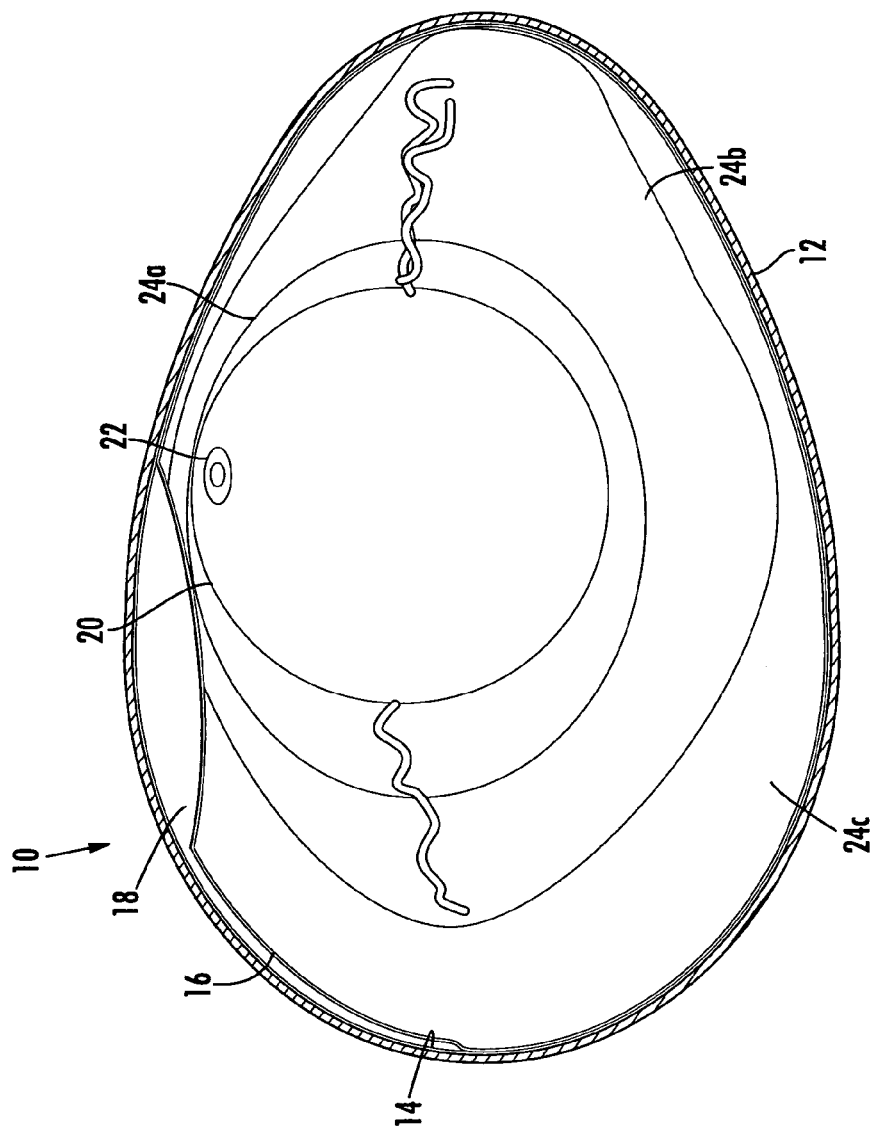
FIG. 3 is a side section view of an avian egg after the egg has been accelerated to separate the outer and inner shell membranes, according to embodiments of the present invention.

According to embodiments of the present invention, an egg is accelerated such that the inner and outer shell membranes within an egg separate and allow the air cell to move within the egg when the egg is repositioned. As illustrated in FIG. 3, the outer and inner shell membranes 14, 16 have been separated and the air cell 18 is free to position itself adjacent an upper portion of the egg shell 12 of the horizontally-positioned egg 10. By separating the outer and inner shell membranes 14, 16, the air cell 18 will reposition itself at the upper portion of the egg shell 12. The air cell 18 moves along the egg in the direction of the acceleration (i.e., the inner and outer shell membranes separate from each other in a certain region along the side of the egg), but the inner shell membrane 16 remains attached everywhere else. Therefore, after acceleration of an egg, the air cell 18 will reposition itself within the egg at the upper portion only if the egg is oriented such that the region where the outer and inner shell membranes 14, 16 have been separated is at the uppermost portion of the egg.

An egg may be accelerated in various ways according to embodiments of the present invention including, but not limited to, agitation, "flicking" by hand, spinning, rotating, centrifuging, etc. According to embodiments of the present invention, to separate the inner and outer shell membranes of an egg without causing damage to either membrane, an acceleration of between about fifty meters per second per second (50 m/s$^2$) and about five hundred meters per second per second (500 m/s$^2$) is employed. If centrifuged, an acceleration of at least about five times the acceleration of gravity (5 g's) is employed.

Figure 4:
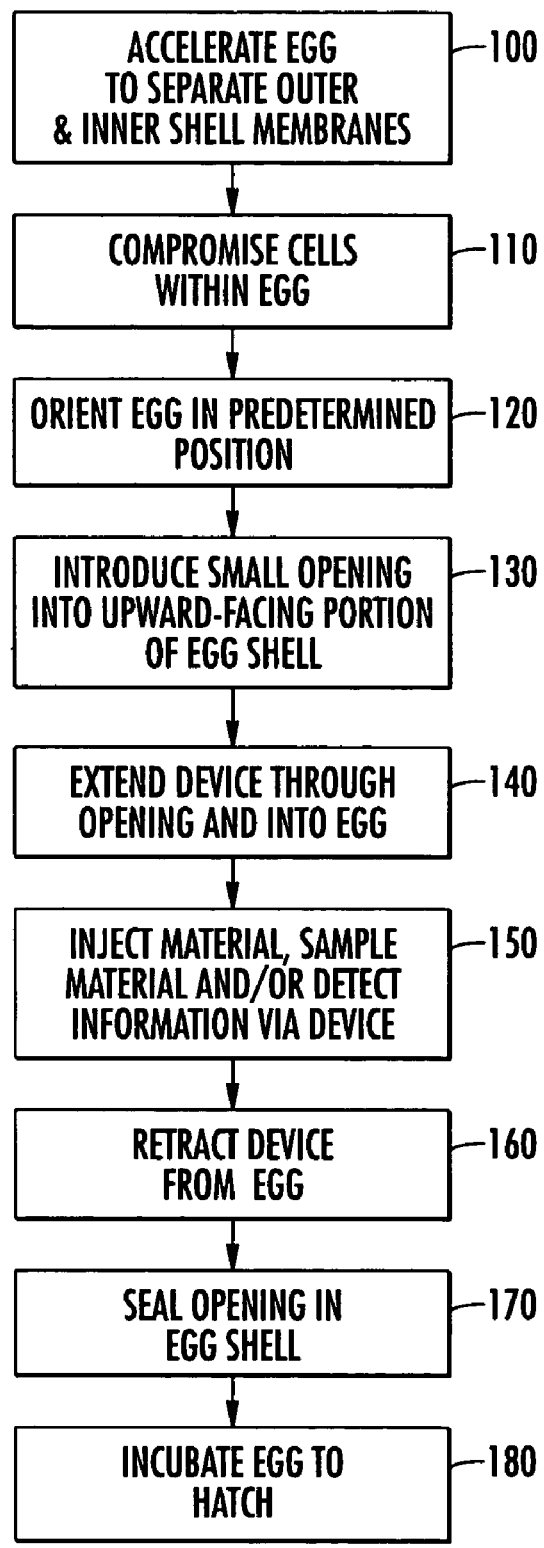
FIG. 4 is a flow chart illustrating operations for injecting eggs according to embodiments of the present invention.

FIG. 4 is a flow chart that illustrates methods of injecting avian eggs, according to embodiments of the present invention. It should be noted that the functions noted in the blocks may occur out of the order noted in FIG. 4. Two (or more) blocks shown in succession may in fact be executed substantially concurrently or the blocks may sometimes be executed in the reverse order, depending on the functionality involved. For example, the step of compromising cells within an egg may occur before or after the step of introducing an opening into an egg.

An egg containing a blastoderm and an air cell is accelerated (Block 100) such that the inner and outer shell membranes of the egg separate and allow movement of the air cell within the egg when the egg is repositioned. As described above, an air cell conventionally is in a substantially stationary location within an egg between inner and outer shell membranes. Various methods of accelerating an egg may be utilized as described above.

In some embodiments, it may be desirable to "compromise" the cells in a recipient embryo prior to introduction of the donor cells (Block 110). As used herein, the term "compromise" means that a certain amount of damage is inflicted on embryonic cells such that endogenous cellular growth is slowed or terminated, thus allowing introduced exogenous cells to proliferate and dominate. Cell compromise can be achieved in a variety of ways. For example, a nonexhaustive list of compromise methods includes heating an egg to a predetermined temperature (e.g., via liquid bath, oven, incubator, etc.), exposing an egg to ammonia and/or other solvents, cooling an egg to a predetermined temperature, subjecting an egg to various types of electromagnetic radiation including, but not limited to, radio frequencies (RF), microwaves, infrared radiation, ultra violet (UV) radiation, gamma ray radiation, x-rays, etc. Other methods of compromising egg cells include laser treatment, cryogenic cooling, and coring. In particular embodiments, irradiation, heating, chemical treatment, and soft x-rays may be applied to the whole egg. Ultraviolet radiation, microwaves, heat, laser treatment, cryogenic treatment, mechanical injury, and coring may be used, in other embodiments, through a window in the egg shell to compromise the embryo. Moreover, length of storage and temperature of storage may be utilized to compromise blastoderm cells.

Referring back to FIG. 4, the egg is then oriented in a predetermined (e.g., horizontal) position, which causes the air cell to move to a location beneath an upward-facing portion of the shell of the egg (Block 120). The eggs are then stored sideways, according to embodiments of the present invention, to allow the blastoderm to position itself on the side, under or near the air cell.

After storage for a period of time, a small opening is introduced into the upward-facing portion of the egg shell (Block 130) via a punch or other device known to those skilled in the art. According to embodiments of the present invention, the surface of an egg, at least around the site of injection, may be sanitized to reduce microbial (or other) contamination (e.g., with an alcohol or other sanitizing solution). However, sanitizing an egg, including the site of injection, is not required with respect to embodiments of the present invention. In addition, a sealant may be applied to the egg shell prior to introducing a small opening into the egg shell, but is not required. If a sealant is applied to the egg shell, the small opening is introduced into the egg shell at the site where the sealant is located. The step of forming an opening in the egg shell (Block 130) may also form an opening in the outer shell membrane. However, in particular embodiments, the inner shell membrane is not affected by forming an opening in the egg shell and remains essentially intact prior to inserting a device therethrough.

The opening in the egg shell may be made in any suitable location, e.g., in the side of the egg near the equatorial axis or at either end of the egg. In a particular preferred embodiment of the invention, the opening in the egg shell is introduced at the upward facing portion of the shell of a generally horizontally positioned egg and over the air cell which is free to move within the egg. Those skilled in the art will appreciate that the early embryo (e.g., blastoderm) will typically locate itself in an area at or near the uppermost portion of the egg. Thus, the opening in the egg shell will generally be made in the uppermost portion of the egg near where the early embryo (e.g., blastoderm) is expected to locate unless measures are taken to steer the embryo to a different position within the egg.

A device is then extended through the small opening in the egg shell and into the egg (Block 140). The device extends through the outer shell membrane and air cell and pierces the inner shell membrane. The device may inject material, sample material and/or detect information (Block 150). If the device inserted within the egg is a delivery device, one or more substances are released through the delivery device and deposited into the blastoderm or in close proximity thereto. One or more substances may also be deposited in other locations within the egg. Embodiments of the present invention are not limited to the deposition of one or more substances at or near the blastoderm.

If the device inserted within the egg is a sampling device, one or more samples (e.g., blastodermal cells) may be removed from the blastoderm or from close proximity thereto. One or more samples may be taken from the extra-embryonic portions of the egg (e.g., the yolk or the albumen). For example, a sample may be taken from the albumen to determine the presence or absence of microbial contamination (e.g., *Salmonella*) therein.

The sampling device may be a needle configured to draw material (e.g., allantoic fluid) from the egg, as would be understood by those skilled in the art. For example, the needle may have a blunt tip and an axially-extending lumen that terminates at an aperture formed within a portion of the needle adjacent the tip. Material can be drawn into the lumen via the aperture upon subjecting the lumen to vacuum. The blunt tip prevents the lumen from becoming clogged with material.

Typically, a sample is removed from the egg to obtain information therefrom. The sample may be removed, for example, in connection with methods of sexing or determining the viability of an embryo. To illustrate, a sample containing cells may be removed from the embryo, and the cells may be analyzed (typically after removal from the egg) to detect the sex chromosomes or sex-specific sequences on the chromosomes, as known by those skilled in the art. The sample may also be used for any other DNA based assay, e.g., to determine the presence of a particular gene or allele of interest in the embryo.

In some embodiments, a multi-site injection or sampling device may be used, for example, as described in U.S. Pat. No. 6,032,612. Other exemplary delivery and/or sampling devices include those described in U.S. Pat. No. 5,136,979; U.S. Pat. Nos. 4,681,063 and 4,903,635; and U.S. Pat. Nos. 4,040,388, 4,469,047, and 4,593,646.

If the device inserted within the egg is a detector, various types of information from the interior of the egg may be detected. The detector may be inserted into an extra-embryonic location of the egg (e.g., the yolk or the air cell). Alternatively, the detector may be placed in close proximity (as defined above) to the embryo. In other embodiments, the detector may be placed into the area pellucida or the area opaca of the embryo or into the subgerminal cavity. The detector device may be used to collect information including, but not limited to, the size of the embryo, the location of the embryo, the developmental stage of the embryo and/or any characteristic feature of the embryo, the sex of the embryo, and/or the viability of the embryo. The detector device may obtain information regarding the location of the embryo and the subgerminal cavity.

The information may be captured by an instrument (e.g., a computer or other data processor) that is connected to the detector. Various types of detectors may be utilized including, but not limited to, electrical sensors, optical sensors, chemical sensors, temperature sensors, acoustic sensors, pressure sensors, or any other device for detecting a physical or chemical parameter. Exemplary detectors are described in U.S. Pat. No. 6,244,214 to Hebrank.

After injecting a substance and/or removing a sample and/or detecting information from the egg, the device is retracted from the egg (Block 160). The small opening in the egg shell may be sealed with a sealant (Block 170) and the egg may be incubated until hatch (Block 180).

Those skilled in the art will appreciate that methods of the present invention may be carried out on a plurality of eggs, e.g., in a commercial poultry operation. Moreover, the methods described herein may be fully manual, fully automated, or semi-automated.

In the following examples, eggs that have been accelerated as described above to separate the outer and inner shell membranes so as to allow the air cell to move within an egg are referred to as "SMAC" eggs. SMAC stands for "side manipulated air cell".

EXAMPLE 1

A group of eggs with the air cell manipulated as described above, referred to as "SMAC" (side manipulated air cell) eggs, that were incubated upright (normal incubation industry practice) led to a 79.7% hatch rate as illustrated below. The first treatment group, SMAC with air bubbles, has eggs with side manipulated air cells in which the inner shell membrane was ruptured during the acceleration to move the air cell. This creates air bubbles in the albumen that are clearly visible when the egg is candled. The second treatment group, SMAC eggs with ⅝" window, had a hole of ⅝ inch diameter drilled in the side of the egg above the side manipulated air cell. The window was then sealed prior to setting to hatch. The third group, SMAC, was only manipulated by moving the air cell, and the final group was the control group.

| Treatment Description | Incubated | Hatch | Fertile Hatch | Early Dead | Late Dead | Live Pip |
|---|---|---|---|---|---|---|
| SMAC with air bubbles | 17 | 5.9% | 6.3% | 12 | 1 | 1 |
| SMAC with ⅝" window | 64 | 79.7% | 82.3% | 4 | 5 | 2 |
| SMAC (no window) | 68 | 76.5% | 76.5% | 5 | 4 | 6 |
| Control | 81 | 87.7% | 89.9% | 4 | 0 | 1 |

These results indicate that the SMAC egg groups where the inner shell membrane is left intact hatch similar to controls.

A group of SMAC eggs with an optimal sealant that were incubated upright (normal incubation industry practice) led to a 88.6% hatch rate as illustrated below. The first two treatments, SMAC with optimal sealant and SMAC with poor sealant, were windowed to make a ⅝ inch diameter hole in the side of the egg above the side manipulated air cell. The first group was sealed with a nonporous sealant that prevented any moisture loss across its barrier. The second group was sealed with a porous sealant that allowed excess moisture loss.

| Group | Qnty | Hatch | Fertile Hatch | Infertile | Early Dead | Middle Dead | Late Dead | Live Pip | Dead Pip | Malpositioned |
|---|---|---|---|---|---|---|---|---|---|---|
| SMAC with Nonporous Sealant | 44 | 88.64% | 90.70% | 1 | 3 | 0 | 0 | 0 | 0 | 1 |
| SMAC with Porous Sealant | 37 | 10.81% | 10.81% | 0 | 23 | 0 | 6 | 2 | 0 | 2 |
| Control | 75 | 85.33% | 85.33% | 0 | 4 | 1 | 0 | 2 | 2 | 2 |

These results indicate that the SMAC treatment with a 5/8" diameter hole has no significant depression in hatch when using a nonporous sealant is used. However a porous sealant causes a very large significant depression in hatch.

EXAMPLE 2

SMAC eggs have superior blastoderm visibility through the inner shell membrane than non-SMAC eggs (eggs windowed at the blunt end of the egg). In a group of SMAC eggs, almost all eggs in the group could be injected because of visibility of the blastoderm. In non-SMAC eggs, a fair number of eggs are rejected since the blastoderm is either too far off from the window or visibility is too poor for injections. SMAC eggs generally have a much more favorable blastoderm position than eggs stored blunt end up with a window at the blunt end of the egg. Eggs for four different treatment groups were scored based on the visibility of the blastoderm under the inner shell membrane. For all four groups the eggs were windowed to make a 5/8" diameter hole in the egg above the air cell. Note for the blunt groups the hole was made at the blunt end of the egg, and for the SMAC groups the hole was made at the side of the egg at which the air cell had been repositioned. A score of 1 or poor represents that the blastoderm is not visible at all. A score of 2 or fair represents that the blastoderm could only be seen by slowly agitating the egg. A score of 3 or good represents being able to see the precise position of the blastoderm, but not being able to discern any details of the underlying structure. A score of 4 or excellent represents being able to clearly see the blastoderm and distant regions such as the area pellucida and area opaca.

| Average Visibility of Blastoderm (n = 50 per group) | | | |
|---|---|---|---|
| Blunt (60 F.) | SMAC (70 F.) | SMAC (60 F.) | Blunt (Room Temp) |
| 1.69 | 3.07 | 2.74 | 1.69 |

Note:
1 poor, 2 fair, 3 good, 4 excellent

These results indicate that both SMAC groups had much better blastoderm visibility than the Blunt groups. This shows that this method makes it much easier to manipulate the blastoderm than through windowing the blunt end of the egg.

EXAMPLE 3

SMAC eggs have been used in manual injections, with a hatch rate of SMAC injected eggs of 92%. All groups of eggs except for group 0, unmanipulated controls, and group 3, SMAC unmanipulated controls, had a window made with a diameter of 5/8" in the egg above the air cell. Groups 1 and 2 had windows made in the blunt end of the egg above the air cell. Groups 4, and 5 had windows made in the side of the egg above the side manipulated air cell. Groups 2 and 5 were injected with phosphate buffered saline solution while all other groups were not injected.

| Group | Treatment Description | Hatch | Fertile Hatch | Infertile | Early Dead | Middle Dead | Live Pip | Dead Pip | Live Not Pip | Mal-positioned | Other |
|---|---|---|---|---|---|---|---|---|---|---|---|
| 0 | Unmanipulated Controls | 82.0% | 82.0% | 0 | 5 | 0 | 2 | 0 | 0 | 1 | 0 |
| 1 | Windowed Blunt End Controls | 80.0% | 80.0% | 0 | 5 | 0 | 1 | 1 | 0 | 2 | 1 |
| 2 | Injected Blunt End | 72.7% | 72.7% | 0 | 10 | 0 | 1 | 0 | 0 | 0 | 1 |
| 3 | SMAC Unmanipulated Controls | 81.3% | 81.3% | 0 | 3 | 1 | 2 | 0 | 1 | 2 | 0 |
| 4 | SMAC 5/8" Window | 86.0% | 86.0% | 0 | 2 | 0 | 1 | 1 | 1 | 2 | 0 |
| 5 | Inject SMAC | 92.0% | 92.0% | 0 | 3 | 0 | 0 | 0 | 0 | 0 | 1 |

Note:
Other is Group 1 Rot 1, Group 2 Malformed 1, Group 5 Late Dead 1

These results indicate that the SMAC treated groups performed as well or better than controls and blunt end groups. This indicates that manipulation of the air cell as described above has no detrimental effect on the developing embryo.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A method of manipulating the air cell within an avian egg, wherein the air cell is in a substantially stationary location within the egg between inner and outer shell membranes, the method comprising accelerating the egg such that the inner and outer shell membranes separate to allow movement of the air cell within the egg when the egg is repositioned.

2. The method of claim 1, wherein the egg is subjected to acceleration of at least about five times the acceleration of gravity (5 g's).

3. The method of claim 1, wherein the egg is accelerated by agitating the egg.

4. The method of claim 1, wherein the egg is accelerated by flicking the egg by hand.

5. The method of claim 1, wherein the egg is accelerated by spinning the egg.

6. The method of claim 1, wherein the egg is accelerated by rotating the egg.

7. The method of claim 1, wherein the egg is accelerated by centrifuging the egg.

8. The method of claim 7, wherein the egg is centrifuged at about at least five times the acceleration of gravity (5 g's).

9. A method of injecting an avian egg, wherein the egg contains an air cell, wherein the air cell is in a substantially stationary location within the egg between inner and outer shell membranes, the method comprising:
   accelerating the egg such that the inner and outer shell membranes separate to allow movement of the air cell within the egg when the egg is repositioned;
   orienting the egg in a predetermined position to cause the air cell to move to a location beneath an upward-facing portion of the shell of the egg;
   introducing a small opening into the upward-facing portion of the egg shell;
   extending a device through the small opening in the egg shell and through the air cell;
   piercing an inner shell membrane with the device; and
   retracting the device from the egg.

10. The method of claim 9, wherein the egg is subjected to acceleration of at least about five times the acceleration of gravity (5 g's).

11. The method of claim 9, wherein the egg is accelerated by agitating the egg.

12. The method of claim 9, wherein the egg is accelerated by flicking the egg by hand.

13. The method of claim 9, wherein the egg is accelerated by spinning the egg.

14. The method of claim 9, wherein the egg is accelerated by rotating the egg.

15. The method of claim 9, wherein the egg is accelerated by centrifuging the egg.

16. The method of claim 15, wherein the egg is centrifuged at about at least five times the acceleration of gravity (5 g's).

17. The method of claim 9, wherein the device is a delivery device and the method further comprises the step, following the piercing step, of releasing a substance through the delivery device and depositing the substance into the egg.

18. The method of claim 17, wherein the device is a multiple injection delivery device.

19. The method of claim 9, wherein the device is a sampling device and the method further comprises the step, following the piercing step, of removing a sample from the egg.

20. The method of claim 19, wherein the sample removed from the egg comprises subgerminal cavity fluid.

21. The method of claim 19, wherein the sample removed from the egg comprises blastodermal cells.

22. The method of claim 9, wherein the device is a detector device and the method further comprises the step, following the piercing step, of detecting with the detector device information from the interior of the egg.

23. The method of claim 22, wherein the detector device is selected from the group consisting of electrical sensors, optical sensors, chemical sensors, temperature sensors, acoustic sensors, and pressure sensors.

24. The method of claim 9, wherein the device is extended through the small opening in the egg shell to a predetermined location.

25. The method of claim 9, wherein the egg contains a blastoderm, and wherein the device is extended through the small opening in the egg shell to a location in the blastoderm or in close proximity thereto.

26. The method of claim 9, further comprising the step of compromising cells within the egg.

27. The method of claim 26, wherein compromising cells within the egg comprises a method selected from the group consisting of heating the egg, cooling the egg, applying microwave energy to the egg, applying radio frequency energy to the egg, applying ultra violet energy to the egg, applying infrared energy to the egg, storing the egg, applying laser ablation to the egg, applying cryoablation to the egg, applying sonication to the egg, and applying electric shock to the egg.

28. The method of claim 26, wherein the step of compromising cells within the egg is performed after introducing a small opening into the upward-facing portion of the egg shell.

29. The method of claim 26, wherein the step of compromising cells within the egg is performed by a device inserted through the small opening.

30. The method of claim 26, wherein the step of compromising cells within the egg comprises compromising a blastoderm within the egg.

31. The method of claim 9, wherein the egg is oriented in a generally horizontal position and the small opening in the egg shell is introduced into the upward facing side of the egg.

32. The method of claim 9, further comprising the step of applying a sealant to the egg shell prior to said step of introducing a small opening into the egg shell, wherein the small opening is introduced into the egg shell at a site at which the sealant is applied.

33. The method of claim 9, wherein the egg is selected from the group consisting of a chicken, turkey, duck, goose, quail, pheasant, parakeet, parrot, cockatoo, cockatiel, ostrich and emu egg.

34. The method of claim 9, further comprising the step of sealing the small opening in the egg shell.

35. The method of claim 9, further comprising the step of incubating the egg until hatch.

36. A method of manipulating an air cell within an avian egg, wherein the egg contains a blastoderm, wherein the air cell is in a substantially stationary location within the egg between inner and outer shell membranes, the method comprising:
   accelerating the egg such that the inner and outer shell membranes separate to allow movement of the air cell within the egg when the egg is repositioned;
   orienting the egg in a substantially horizontal position to cause the air cell to move to a location beneath an upward-facing portion of the shell of the egg; and
   storing the egg in the substantially horizontal position for a period of time sufficient to cause the blastoderm to position itself near the air cell.

37. The method of claim 36, wherein the egg is subjected to acceleration of at least about five times the acceleration of gravity (5 g's).

38. The method of claim 36, wherein the egg is accelerated by agitating the egg.

39. The method of claim 36, wherein the egg is accelerated by flicking the egg by hand.

40. The method of claim 36, wherein the egg is accelerated by spinning the egg.

41. The method of claim 36, wherein the egg is accelerated by rotating the egg.

42. The method of claim 36, wherein the egg is accelerated by centrifuging the egg.

43. The method of claim 42, wherein the egg is centrifuged at about at least five times the acceleration of gravity (5 g's).

44. A method of manipulating the air cell within an avian egg, wherein the air cell is in a substantially stationary location within the egg between inner and outer shell membranes, the method comprising:
   introducing an opening into the shell of the egg;
   inserting a device into the egg through the opening; and
   separating the inner and outer shell membranes with the device to allow movement of the air cell within the egg when the egg is repositioned.

* * * * *

UNITED STATES PATENT AND TRADEMARK OFFICE
CERTIFICATE OF CORRECTION

PATENT NO. : 7,089,879 B2
APPLICATION NO. : 10/934201
DATED : August 15, 2006
INVENTOR(S) : Wolfe et al.

It is certified that error appears in the above-identified patent and that said Letters Patent is hereby corrected as shown below:

On the Title Page,
Section 75 should include the following inventors:
Nandini Mendu, Chapel Hill, NC (US)
Ramakrishnan Yelleshpur Nagaraj, Cary, NC (US)

Signed and Sealed this

Ninth Day of January, 2007

JON W. DUDAS
*Director of the United States Patent and Trademark Office*

UNITED STATES PATENT AND TRADEMARK OFFICE
CERTIFICATE OF CORRECTION

PATENT NO.          : 7,089,879 B2  
APPLICATION NO. : 10/934201  
DATED                   : August 15, 2006  
INVENTOR(S)         : Wolfe et al.

It is certified that error appears in the above-identified patent and that said Letters Patent is hereby corrected as shown below:

<u>On the Title Page,</u>
Section 75 should include the following inventors:  
Nandini Mendu, Chapel Hill, NC (US)  
Ramakrishnan Yelleshpur Nagaraj, Cary, NC (US)

Signed and Sealed this

Fourth Day of September, 2007

JON W. DUDAS  
*Director of the United States Patent and Trademark Office*